(12) United States Patent
Clayton

(10) Patent No.: US 12,576,960 B2
(45) Date of Patent: Mar. 17, 2026

(54) JOINT ASSEMBLY IN AN AIRCRAFT STRUCTURE

(71) Applicant: Airbus Operations Limited, Bristol (GB)

(72) Inventor: Richard James Clayton, Bristol (GB)

(73) Assignee: Airbus Operations Limited, Filton (GB)

( * ) Notice: Subject to any disclaimer, the term of this patent is extended or adjusted under 35 U.S.C. 154(b) by 0 days.

(21) Appl. No.: 19/072,348

(22) Filed: Mar. 6, 2025

(65) Prior Publication Data

US 2025/0282468 A1 Sep. 11, 2025

(30) Foreign Application Priority Data

Mar. 11, 2024 (GB) ...................................... 2403462

(51) Int. Cl.
*B64C 3/26* (2006.01)
*B64C 3/18* (2006.01)

(52) U.S. Cl.
CPC ................ *B64C 3/26* (2013.01); *B64C 3/187* (2013.01)

(58) Field of Classification Search
CPC ... B64C 3/26; B64C 3/187; B64C 1/12; B64F 5/10
See application file for complete search history.

(56) References Cited

U.S. PATENT DOCUMENTS

| | | | |
|---|---|---|---|
| 8,479,394 | B2 | 7/2013 | Glazebrook |
| 8,621,819 | B2 | 1/2014 | Kayani |
| 10,738,814 | B2 | 8/2020 | Bradley |
| 11,325,691 | B2 | 5/2022 | Whitmer |
| 11,851,213 | B1 * | 12/2023 | Cowan .................. B29C 65/562 |
| 2008/0308211 | A1 | 12/2008 | Crumpler |
| 2012/0276362 | A1 | 11/2012 | Denavit |
| 2019/0003504 | A1 | 1/2019 | Bradley |
| 2019/0359815 | A1 | 11/2019 | Roye |
| 2022/0194019 | A1 | 6/2022 | Hafenrichter |
| 2023/0066560 | A1 * | 3/2023 | Widdle ..................... B64F 5/10 |

FOREIGN PATENT DOCUMENTS

EP 1963186 B1 11/2010

OTHER PUBLICATIONS

United Kingdom Intellectual Property Office Combined Search and Examination Report for GB Application No. 2403462.1, dated Aug. 30, 2024, 8 pages.
Extended European Search Report in EP Application No. 25162075.3, dated May 9, 2025, & pages.

* cited by examiner

*Primary Examiner* — Rodney A Bonnette

(74) *Attorney, Agent, or Firm* — KDW Firm PLLC

(57) ABSTRACT

A joint assembly in an aircraft, for example between a wing skin and rib foot. The joint assembly includes fasteners mechanically holding the wing skin and rib foot together. The rib foot includes circular faying surfaces and a layer of material is sandwiched between the faying surfaces and the wing skin. The layer of material has adhesive properties such that the joint is a hybrid joint. The layer of material also has structural properties to function as a solid shim, for example once it has cured after application.

18 Claims, 3 Drawing Sheets

100 – Bring components 1, 5 into correct positions

102 – Inject dual-function material 15 through pilot holes

104 – Cure injected material 15

106 – Drill hole 9 through components 1, 5 and shim 15

108 – Apply fasteners 7 through holes

JOINT ASSEMBLY IN AN AIRCRAFT STRUCTURE

TECHNICAL FIELD

The present disclosure relates to a joint assembly in an aircraft structure and to methods of joining aircraft components.

BACKGROUND

There are a number of different ways in which aircraft components can be joined together. In some arrangements, the components are mechanically held together, for example using fasteners. In the context of an aircraft wing, the wing skin may be attached to the rib feet of an aircraft rib, and this may be achieved by mechanically holding the wing skin to the rib feet using fasteners inserted through holes in the wing skin and in the rib feet. In such arrangements, each fastener is typically placed under pre-load to ensure a robust joint is achieved. It is important to maintain the correct wing skin profile, so where there are gaps between the rib feet and the wing skin (for example due to tolerances between the two components) it may be necessary to provide a shim.

U.S. Pat. No. 8,479,394 (Airbus Operations Limited) discloses an arrangement in which the wing skin and the rib feet are measured prior to assembly, and a shim of varying thickness is manufactured to fit the gap between the two structures. During assembly of the wing, a layer of sealant is applied to the outer face of each shim and the wing skin is brought into contact with the sealant/shim. Fasters are then passed through the wing skin, the shim and the rib feet, to mechanically join the wing skin to the rib.

U.S. Ser. No. 11/325,691 (The Boeing Company) also discloses a joint between a wing skin and a rib foot. A plurality of faying surfaces are provided on the rib foot. This reduces the overall contact area between the rib foot and the wing skin and reduces the need for shimming between the surfaces. U.S. Ser. No. 11/325,691 aims to remove the need for shimming altogether, but where a gap between the faying surface and the wing skin is still present, that gap is detected and measured, and a solid shim is then positioned within the gap.

Both of the above-mentioned disclosures seek to improve the efficiency of joining the wing skin to the rib foot. It is desirable to yet further improve this process. Alternatively or additionally it is desirable to provide an improved joint assembly in an aircraft structure.

SUMMARY

According to a first aspect of the disclosure, there is provided a joint assembly in an aircraft, the joint assembly comprising: a first aircraft component having a plurality of holes therein; a second aircraft component having a plurality of holes therein; and a plurality of fasteners. Each fastener extends through a respective hole in the first aircraft component and a respective hole in the second aircraft component, and the plurality of fasteners are arranged such that the fasteners mechanically hold the first and second aircraft components together. The first aircraft component comprises a plurality of faying surfaces arranged at an interface with the second aircraft component, each faying surface being raised above a non-faying surface of the first aircraft component, and each faying surface surrounding a respective hole in the first aircraft component. The joint assembly further comprises a layer of material sandwiched directly between the faying surfaces and the second aircraft component, the layer of material having adhesive properties such that it structurally bonds the first and second aircraft components together. The layer of material preferably also has structural properties to function as a shim.

Providing a faying surface on the first aircraft component has been found to be especially beneficial in conjunction with the layer of material acting as both an adhesive and a shim. In particular, the provision of a faying surface may enable the joint to be formed while using only a relatively small amount of material in the layer. The arrangement may also facilitate a relatively simple, visual, indication that the layer of material has been correctly applied between the faying surface and the second component because the operator may be able to see most of, or all of, the edges of the faying surface.

Materials having both adhesive properties and structural properties to function as a shim, are known. For example, US2019/0359815 describes a curable material for the simultaneous filling of tolerances and for sealing of components to be bonded in aircraft construction. The material in the layer of material in aspects of the disclosure herein, may be the material disclosed in US2019/0359815. The material in the layer of material may have been cured, the material having been derived from a curable pre-cursor. The curable pre-cursor (i.e. the material before it has been cured) may be a liquid shim. The material may be configured to fill a volume arising due to tolerances between the faying surfaces and the second aircraft component, and to subsequently cure to form the solid shim. References herein to 'adhesive material' or alike will be understood to equally refer to the same material having the structural shimming properties once solidified. This material is also referred to herein as a 'dual-function' material.

The layer of material has structural properties to function as a shim. For example, the layer of material may have a modulus of elasticity suitable for acting as a shim. The layer of material may be drillable. The layer of material may have a gap-filling capacity for filing gaps of 3 mm or less, and preferably for filing gaps of between 0.2 mm and 2.5 mm.

It will be appreciated that the reference to a 'layer' of material does not necessarily imply the layer is of uniform thickness. In fact, the layer is typically of varying thickness, this varying thickness arising from the tolerance between the faying surfaces and the second component. The layer of material is between each faying surface and the second component, and each of these layers need not necessarily adjoin one another.

The structural bond between the first and second components, created by the adhesive properties of the layer of material, is sufficient to contribute to the strength of the joint assembly. In this context, the skilled person will appreciate that the resulting joint assembly (having adhesive and fasteners) may be considered a hybrid joint. The adhesive properties of the material are preferably sufficient to ensure the material acts as a seal (for example to prevent egress of moisture).

Each faying surface may be substantially circular. The circular surface is preferably centered on the hole that the faying surface surrounds. Such an arrangement has been found to be especially beneficial because the faying surface may then substantially match the shape formed by the layer of material if that material is injected onto the faying surface via the hole. As the material will typically flow radially outward, embodiments of the disclosure herein recognise that the material can be efficiently applied to a correspondingly circular faying surface. The faying surface may include a chamfer, for example at its outer edges. Providing a chamfer has been found to be beneficial in facilitating a high peel strength between the faying surface and the second aircraft component.

The hole may have a first diameter and the faying surface may have a second diameter. The magnitude of the second diameter may be between 2 and 4 times the first diameter. The magnitude of the second diameter may be around 3 times the magnitude of the first diameter. Such an arrangement has been found to be especially efficient.

The layer of material preferably only contacts the first component on the faying surface of the first aircraft component. The layer of material preferably does not contact the non-faying surface of the first aircraft component. Such an arrangement allows the process to be relatively efficient in terms of time and material. The arrangement may allow the operator to readily detect (for example via a visual indication) that the material has been applied to the faying surface. The arrangement may also avoid, or minimize, the need to clean up excess spew of the material.

The faying surface may be raised above the non-faying surface. The faying surface may be raised by a uniform magnitude above the non-faying surface. For example, the faying surface may be raised by at least 1 mm, preferably at least 2 mm and preferably between 3 mm and 4 mm above the non-faying surface. The faying surface being raised by 3-4 mm from the non-faying surface has been found to be especially beneficial because it tends to avoid water becoming trapped between the two surfaces.

In principle the joint assembly is suitable for use between a number of different aircraft components. Embodiments of the disclosure have been found to be especially beneficial in the context of the rib/wing skin joint. Thus, in preferred embodiments, the first aircraft component may be a rib. The rib may comprise a plurality of rib feet, the plurality of holes being located in the rib feet of the rib. The second component may be a wing skin.

It will be appreciated that reference herein to a component does not imply a unitary structure. For example, the component may itself be formed from a plurality of sub-components and may be pre-assembled therefrom.

According to another aspect of the disclosure, there is provided a method of joining a first aircraft component to a second aircraft component, wherein the method comprises the steps of: bringing the first aircraft component and the second aircraft component into proximity to one another; applying an adhesive material and arranging the first and second components such that the adhesive material is located on a plurality of faying surfaces of the first aircraft component and is sandwiched directly between the faying surfaces and second aircraft component, wherein the adhesive material is also a curable pre-cursor material, and the curable pre-cursor material is applied such that it fills a volume arising due to tolerances between the faying surfaces and the second aircraft component, and wherein the method comprises the step of curing the curable pre-cursor material such that it forms a solid shim in the volume; drilling a plurality of holes in the first and second aircraft components, each hole comprising a pair of aligned holes in the first and the second components; and attaching a plurality of fasteners, each fastener extending through a respective pair of aligned holes, the fasteners being arranged to mechanically hold the first and second aircraft components together, such that the components are simultaneously mechanically held together by the fasteners and adhesively bonded together by the adhesive material.

In some embodiments, some of the steps may be undertaken in a different order to those listed above. For example, the adhesive material may be applied to the first component prior to the step of bringing the first and second components into proximity. The first and second components may be brought into proximity after the adhesive material has been applied, and in doing so the material may be sandwiched directly between the faying surfaces and the second component. Such a method may be used when, for example, the adhesive material is applied using a 'butter and paste' method.

More preferably, the steps of the above-mentioned method are conducted in the order recited. One of the first or second aircraft components, and more preferably the first aircraft component, may comprise a plurality of pilot holes. The pilot holes may be holes through which the plurality of holes (for receiving the fasteners) are subsequently drilled. The step of applying the adhesive material may comprise the step of injecting the adhesive material through the pilot holes in the first or second aircraft components and onto the faying surfaces. Such an arrangement has been found to be especially beneficial because the adhesive material typically spreads radially and therefore efficiently covers the faying surface.

According to yet another aspect of the disclosure, there is provided a hybrid joint between a wing skin and a rib, the joint comprising a portion of wing skin having a plurality of holes therethrough and a rib foot of the rib, the rib foot having a plurality of holes therethrough; and a plurality of fasteners mechanically holding the portion of wing skin to the rib foot, each fastener extending through respective holes of the rib foot and of the portion of wing skin; and wherein the rib foot comprises a plurality of raised pads arranged at an interface with the wing skin, each raised pad surrounding a respective hole in the rib foot, and wherein the joint further comprises a cured adhesive sandwiched directly between the pads and the wing skin, the cured adhesive having adhesive properties such that it structurally bonds the pad of the rib foot to the wing skin, and the cured adhesive also having structural properties such that it fills a volume arising due to tolerances between the pads and the wing skin and functions as a shim.

It will of course be appreciated that features described in relation to one aspect of the present disclosure may be incorporated into other aspects of the present disclosure. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only, with reference to the accompanying schematic drawings of which.

DETAILED DESCRIPTION

Figure 1:
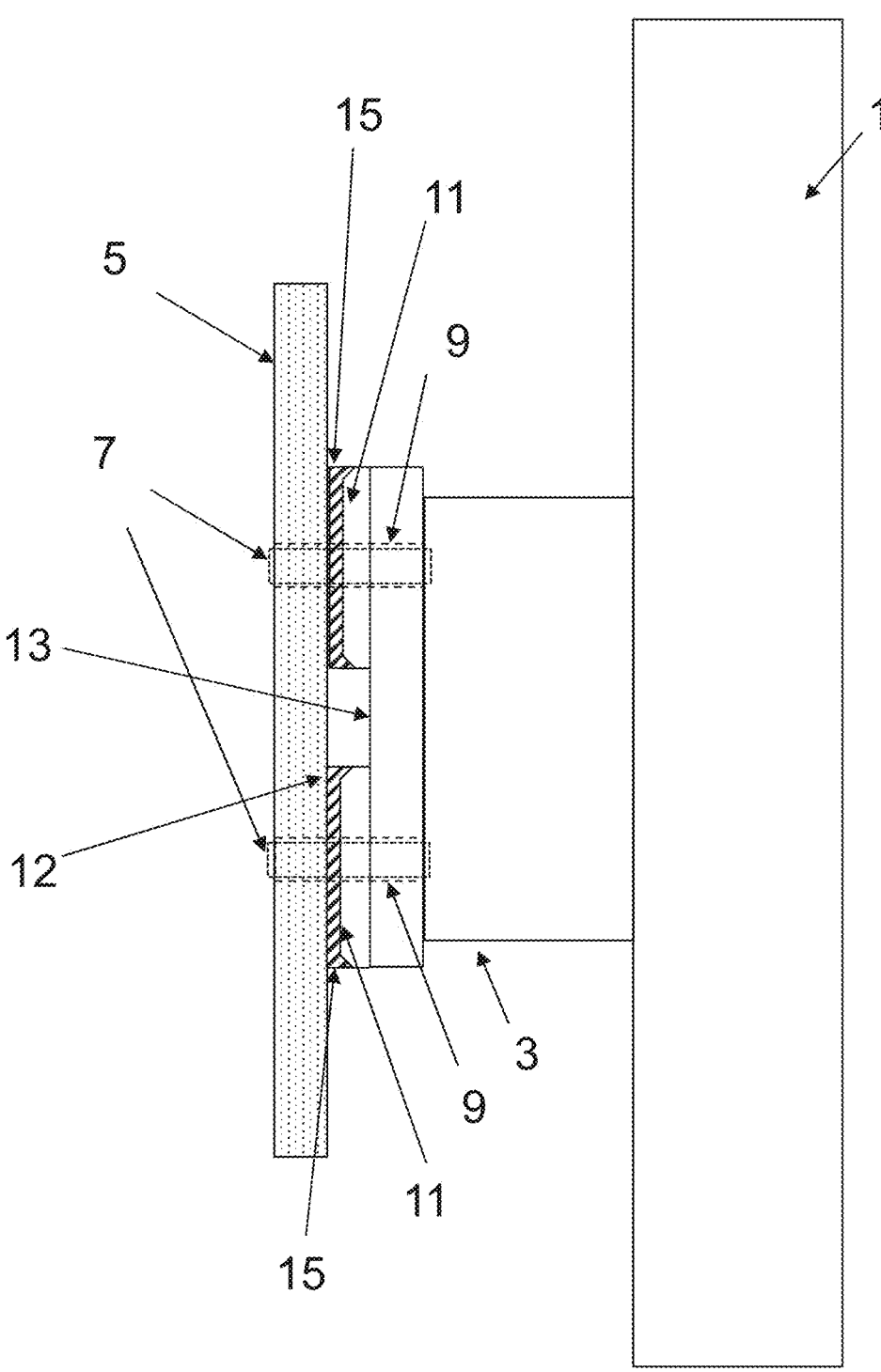
FIG. 1 shows a side view of a joint assembly of a first embodiment of the disclosure herein, the joint assembly being formed by a rib foot and a wing skin of an aircraft.

According to a first embodiment of the disclosure herein, there is provided a joint assembly as shown in FIG. 1. The joint assembly comprises a rib 1, the rib 1 comprising a plurality of rib feet 3. For the sake of clarity, only one rib foot 3 is shown in FIG. 1, but it will be appreciated that the rib feet 3 extend around the upper and lower surfaces of the rib 1 in a conventional manner, and are arranged to interface with the surrounding wing skin 5 to form a wing box structure.

The joint assembly also comprises a second component in the form of the wing skin 5. The wing skin 5 is mechanically held to the rib foot 3 via a series of fasteners 7 which extend through respective holes 9 in the wing skin 5 and the rib foot 3 respectively (the holes 9 and the fasteners 7 are shown in phantom in FIG. 1 and just the holes 9 are shown in FIG. 2).

Figure 2:
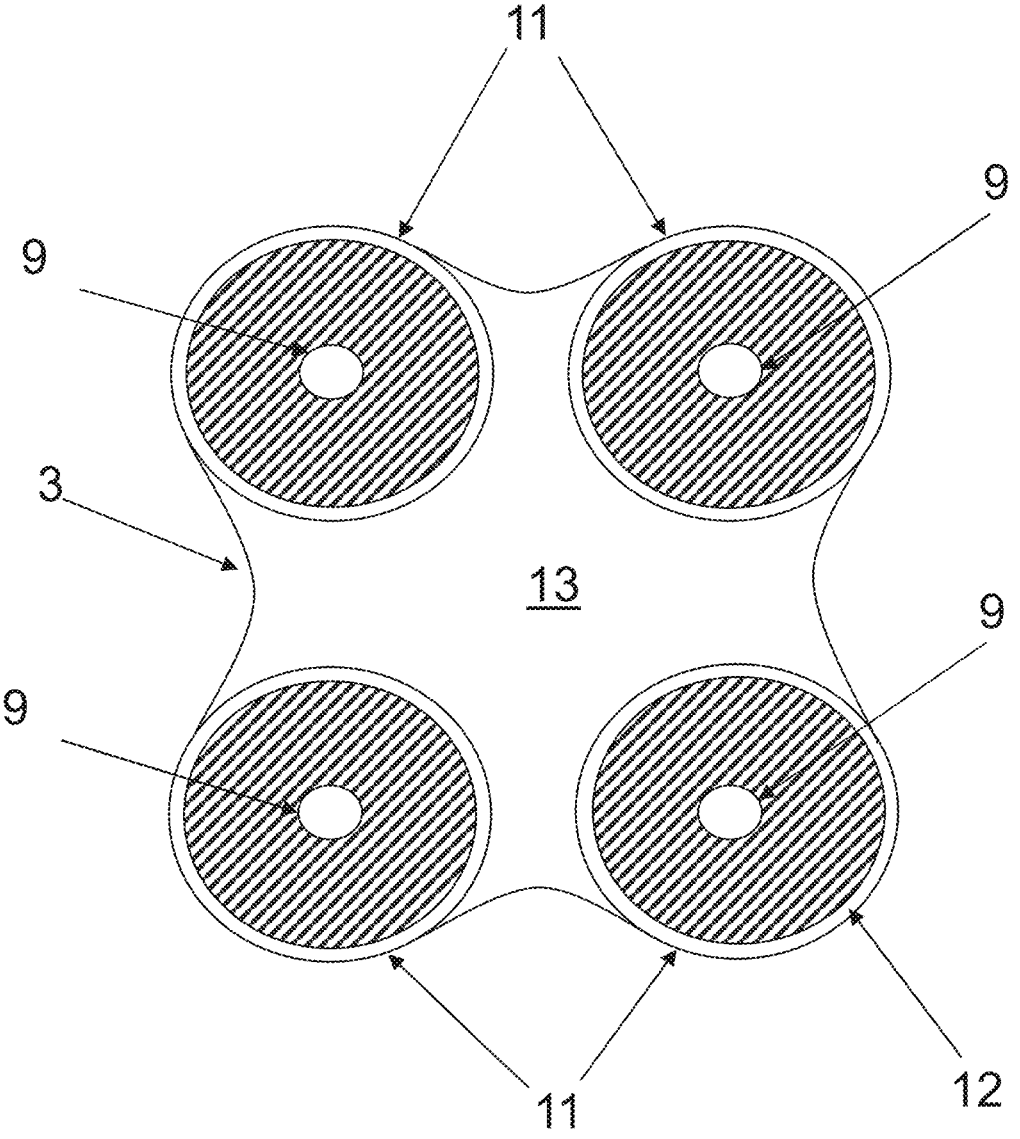
FIG. 2 shows a plan view of the underside of the rib foot in FIG. 1.

In the embodiment of the disclosure herein illustrated in FIGS. 1 and 2, each rib foot 3 comprises four spaced-apart faying surfaces 11. The faying surfaces 11 are raised approximately 3-4 mm above the underlying non-faying surface 13 of the rib foot 3. Each faying surface 11 is substantially circular in planform and the circle is centered on the respective hole 9 through which the fastener 7 extends. The faying surfaces 11 are substantially planar but also include a small chamfer 12 around their perimeter. The above-described arrangement has been found to be especially beneficial when used in conjunction with a combined adhesive-shimming material, as will now be described below:

Referring to FIG. 1, the joint assembly comprises a layer 15 of material sandwiched directly between the faying surfaces 11 and the inner surface of the wing skin 5. This layer of material 11 has adhesive properties such that it structurally bonds and seals the rib foot 3 and the wing skin 5 together. The joint assembly of the first embodiment is thus a hybrid joint and the components are held together by both the adhesive bond created by the layer of adhesive material 15, and the mechanical coupling created by the fasteners 7.

In the first embodiment, the adhesive material is a dual function adhesive-shimming material. The material 15 is applied as a curable pre-cursor (described in more detail below with reference to FIG. 3). In this viscous form it is able to flow to fill any volume arising due to differences in tolerance between the wing skin 5 and the rib foot 3 (or more specifically between the inner surface of the wing skin 5 and the faying surfaces 11 of the rib foot 3). The material 15, when subsequently cured, then solidifies to form a shim between the wing skin 5 and rib foot 3. A material having these properties is described in, for example, US2019/0359815.

Providing the circular faying surfaces 11 on the rib foot 3 has been found to be especially beneficial in conjunction with this layer of material 15 that acts as both an adhesive and a shim. In particular, the provision of the faying surfaces 11 enables the joint to be formed while using only a relatively small amount of material 15 in the layer. The protruding faying surfaces 11, and the volume of adhesive material 15 applied, are such that the material does not contact the non-faying surface 13. The arrangement may therefore also facilitate a relatively simple, visual, indication that the layer of material 15 has been correctly applied between the faying surfaces 11 and the wing skin 5 because the operator may be able to see most of, or all of, the edges of each faying surface 11 and will be able to visually check that this surface has been sufficiently covered (for example by checking the material 15 extends to the edges of the faying surface 11).

In the first embodiment of the disclosure herein, the faying surfaces 11 are circular and are approximately 3 times the diameter of the holes 9 through which the fastener 7 is received. This ratio of fastener hole diameter 9 to faying surface 11 diameter has been found to be especially beneficial. The circular nature of the surface is also beneficial because when the adhesive material 15 is applied (described with reference to FIG. 3) it tends to spread radially from the injection point and therefore uniformly across the faying surface 11.

Figure 3:
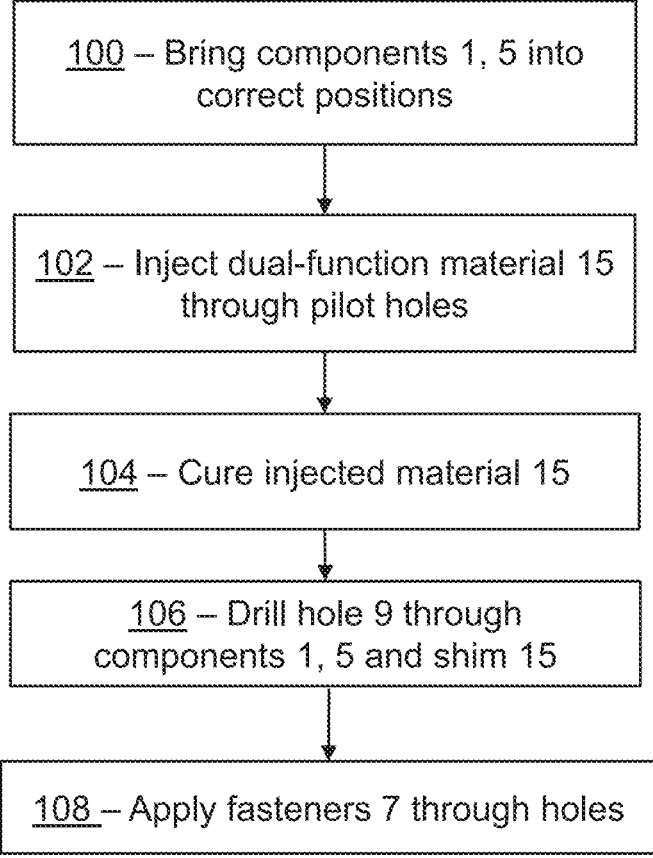
FIG. 3 is a flow diagram illustrating a method of joining two aircraft structures, to form the joint assembly of FIGS. 1 and 2.

FIG. 3 is a flow diagram illustrating a method of joining two aircraft structures, to form the joint assembly of FIGS. 1 and 2, and reference will now be made to that method.

The first step 100 of forming the joint assembly is to bring to the rib 1 and the wing skin 5 into proximity to one another. In a similar manner to known methods of wing assembly, each aircraft component is held in a jig and the components are carefully brought into the correct position for assembly.

In the first embodiment of the disclosure herein, the holes 7 are drilled once the wing skin 5 and rib feet 3 have been bonded by the layer of adhesive material 15. Accordingly, the fastener holes 7 are not initially present in the rib feet 3 or wing skin 5. Instead, the rib feet 3 initially only have pilot holes centered on where the fastener hole 7 will be subsequently drilled (see step 106 below). The first embodiment of the disclosure herein uses these pilot holes in a beneficial manner to ensure efficient and accurate application of the dual-function adhesive-shimming material 15. This takes place as the next step 102, in which the dual-function adhesive material 15 is injected through the pilot holes in the rib feet 3. Due to the close proximity of the wing skin 5, the adhesive material will fill the gap between the faying surface 11 and the wing skin 5 and will spread radially outward from the pilot hole and across the faying surface 11. The material 15 is injected through each pilot hole until the operator can visually see the material at the circumferential edges of the respective faying surface 11.

The adhesive material 15 injected through the pilot holes is a curable pre-cursor material, and flows in a manner to fill any volume arising due to tolerances between the faying surfaces 11 and the wing skin 5. In step 104, the injected material is cured, and the material 15 is of a type that forms a solid shim in the volume once cured.

Once the material has cured to form the solid shim, the next step 106 is conducted: Holes 9 are drilled through the wing skin 5, the rib foot 3, and the layer of shim material 15 sandwiched therebetween. The holes 9 are centered on the center of each faying surface 11.

Upon completion of the drilling, a fastener 7 is applied through each hole 9 with pre-load (step 108), thereby mechanically holding the wing skin onto the rib foot.

The resulting joint assembly thus comprises a hybrid joint with both adhesive and mechanical forces contributing to the joint strength. Furthermore, the joint assembly includes a shim to ensure the correct shape of the wing skin on the rib feet.

While the disclosure herein has been described and illustrated with reference to a particular embodiment, it will be appreciated by those of ordinary skill in the art that the disclosure herein lends itself to many different variations not specifically illustrated herein.

By way of example, in another embodiment the adhesive material is not injected and is instead applied using a 'butter and paste' method. In this arrangement the material is applied before the wing skin is brought into position against the rib feet, and becomes subsequently sandwiched between the wing skin and rib feet, as the wing skin is brought into position against the rib feet.

By way of another example, the joint assembly having aspects of the present disclosure may be formed between other aircraft components, and not necessarily only the wing skin and rib feet.

By way of another example, the faying surfaces 11 need not necessarily include a chamfer 12. In such an embodiment, an external fillet for the layer of material may instead be provided. Such an arrangement does, however, tend to be more time consuming to assemble that arrangements with an internal chamfer on the faying surface.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

While at least one example embodiment of the invention (s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of joining a first aircraft component to a second aircraft component, comprising sequential steps of:
bringing the first aircraft component and the second aircraft component into proximity to one another, wherein:
the first aircraft component comprises a plurality of faying surfaces, each of which is circular and raised above a non-faying surface of the first aircraft component; and
the second aircraft component comprises a plurality of pilot holes;
injecting an adhesive material, which comprises a curable pre-cursor material, through the plurality of pilot holes of the second aircraft component and onto a plurality of faying surfaces of the first aircraft component;
arranging the first and second aircraft components such that the adhesive material is sandwiched directly between the faying surfaces and the second aircraft component, wherein the curable pre-cursor material is applied to fill a volume arising due to tolerances between the faying surfaces and the second aircraft component; and
curing the curable pre-cursor material within the volume between the faying surfaces and the second aircraft component to form a solid shim in the volume;

drilling through the plurality of pilot holes of the second aircraft component to form a plurality of holes in the first and second aircraft components, each hole of the plurality of holes comprising a pair of aligned holes in the first and second aircraft components; and
attaching a plurality of fasteners, each fastener of the plurality of fasteners extending through a respective pair of aligned holes, the fasteners being arranged to mechanically hold the first and second aircraft components together,
wherein the first and second aircraft components are simultaneously mechanically held together by the plurality of fasteners and adhesively bonded together by the adhesive material;
wherein, when the first aircraft component and the second aircraft component are brought into proximity to one another, each of the faying surfaces is centered on a respective one of the plurality of pilot holes, through which the adhesive material is injected; and
wherein the adhesive material does not contact the non-faying surface of the first aircraft component.

2. The method of claim 1, wherein:
the first aircraft component is a rib comprising a plurality of rib feet;
the plurality of holes that are formed in the first aircraft component are located in the rib feet of the rib; and
the second aircraft component is a wing skin.

3. The method according to claim 1, wherein the plurality of faying surfaces are raised above the non-faying surface by at least 1 millimeter (mm).

4. The method according to claim 3, wherein the plurality of faying surfaces are raised above the non-faying surface by at least 2 mm.

5. The method according to claim 4, wherein the plurality of faying surfaces are raised above the non-faying surface by 3-4 mm.

6. The method according to claim 5, wherein the plurality of faying surfaces are raised above the non-faying surface by 3 mm.

7. The method according to claim 5, wherein the plurality of faying surfaces are raised above the non-faying surface by 4 mm.

8. The method according to claim 1, wherein:
each of the plurality of holes formed in the first aircraft component has a first diameter;
each of the plurality of faying surfaces has a second diameter; and
the second diameter is larger than the first diameter.

9. The method according to claim 8, wherein a magnitude of the second diameter is 2-4 times a magnitude of the first diameter.

10. The method according to claim 9, wherein the magnitude of the second diameter is 3 times the magnitude of the first diameter.

11. A joint assembly in an aircraft, the joint assembly comprising:
a first aircraft component comprising:
a plurality of holes, each of which has a first diameter; and
a plurality of faying surfaces, each of which is circular, raised above a non-faying surface of the first aircraft component, has a second diameter, and surrounds and is centered on a respective hole of the plurality of holes; a second aircraft component having a plurality of holes therein;
a plurality of fasteners, each fastener extending through a respective hole in the first aircraft component and a respective hole in the second aircraft component, and the plurality of fasteners being arranged such that the fasteners mechanically hold the first and second aircraft components together; and a layer of material sandwiched between the plurality of faying surfaces and the second aircraft component, the layer of material having:

adhesive properties to structurally bond the first and second aircraft components together; and structural properties to function as a shim;

wherein the layer of material is formed from a material derived from a curable pre-cursor that is configured to fill a volume arising due to tolerances between the plurality of faying surfaces and the second aircraft component;

wherein the material that forms the layer of material is cured within the volume to form the solid shim;

wherein the layer of material does not contact the non-faying surface of the first aircraft component;

wherein the first and second aircraft components are simultaneously mechanically held together by the plurality of fasteners and adhesively bonded together by the layer of material; and wherein a magnitude of the second diameter is 2-4 times a magnitude of the first diameter.

12. The joint assembly according to claim 11, wherein the magnitude of the second diameter is 3 times the magnitude of the first diameter.

13. The joint assembly according to claim 11, wherein:

the first aircraft component is a rib comprising a plurality of rib feet;

the plurality of holes of the first aircraft component are located in the rib feet of the rib; and the second aircraft component is a wing skin.

14. The joint assembly according to claim 11, wherein the plurality of faying surfaces are raised above the non-faying surface by at least 1 millimeter (mm).

15. The joint assembly according to claim 14, wherein the plurality of faying surfaces are raised above the non-faying surface by at least 2 mm.

16. The joint assembly according to claim 15, wherein the plurality of faying surfaces are raised above the non-faying surface by 3-4 mm.

17. The joint assembly according to claim 16, wherein the plurality of faying surfaces are raised above the non-faying surface by 3 mm.

18. The joint assembly according to claim 16, wherein the plurality of faying surfaces are raised above the non-faying surface by 4 mm.

* * * * *